US012439427B2

United States Patent
Malkamäki et al.

(10) Patent No.: US 12,439,427 B2
(45) Date of Patent: Oct. 7, 2025

(54) PTM RETRANSMISSION RECEPTION BY UES IN RRC_INACTIVE/IDLE WITH DRX

(71) Applicant: Nokia Technologies Oy, Espoo (FI)

(72) Inventors: Esa Mikael Malkamäki, Espoo (FI); Ugur Baran Elmali, Munich (DE); Subin Narayanan, Oulu (FI); Dariush M. Soleymani, Ulm (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/857,607

(22) PCT Filed: May 31, 2024

(86) PCT No.: PCT/EP2024/064981
§ 371 (c)(1),
(2) Date: Oct. 17, 2024

(87) PCT Pub. No.: WO2025/026602
PCT Pub. Date: Feb. 6, 2025

(65) Prior Publication Data
US 2025/0261204 A1   Aug. 14, 2025

(30) Foreign Application Priority Data
Jul. 31, 2023   (FI) ........................................ 20235850

(51) Int. Cl.
*H04W 72/23*  (2023.01)
*H04L 1/1829* (2023.01)
(Continued)

(52) U.S. Cl.
CPC ........... *H04W 72/23* (2023.01); *H04L 1/1848* (2013.01); *H04W 76/27* (2018.02); *H04W 76/28* (2018.02); *H04W 76/40* (2018.02)

(58) Field of Classification Search
CPC ..... H04W 72/23; H04W 76/27; H04W 76/28; H04W 76/40; H04L 1/1848
See application file for complete search history.

(56) References Cited

U.S. PATENT DOCUMENTS 11,956,780 B2 *  4/2024  Lee ...................... H04L 1/1812
11,962,420 B1 *  4/2024  Tseng .................. H04L 1/1851
(Continued)

FOREIGN PATENT DOCUMENTS

WO   2022/205296 A1   10/2022
WO   2022/231249 A1   11/2022

OTHER PUBLICATIONS

"New SID: Architectural enhancements for 5G multicast-broadcast services Phase 2", TSG SA Meeting #SP-94E, SP-211645, Agenda: 9.1.3, Huawei, Dec. 14-20, 2021, pp. 1-5.
(Continued)

*Primary Examiner* — Will W Lin
(74) *Attorney, Agent, or Firm* — Nokia Technologies Oy

(57) ABSTRACT

Described herein is a User Equipment, UE, comprising: at least one processor, and at least one memory storing instructions that, when executed by the at least one processor, cause the UE at least to, during or before a Multicast/Broadcast Service, MBS, session; receive, from a network node, a configuration message configuring at least one Retransmission Timer; receive, while the UE is in an inactive state or an idle state, a Physical Downlink Control Channel, PDCCH, transmission that is associated with the MBS session and that schedules a Transport Block, TB, of the MBS session with a group identifier identifying a group of UEs comprising the UE in the inactive or idle state and one or more UEs in a connected state; receive the scheduled TB in the inactive or idle state, via Point-To-Multipoint, PTM, Physical Downlink Shared Channel, PDSCH transmission associated with the MBS session; and in case of determining (Continued)

a failure in decoding the received TB; start the at least one Retransmission Timer based on the configuration message; and monitor, before the at least one Retransmission Timer expires, a PDCCH for at least one PTM retransmission for the failed TB requested by the one or more UEs in the connected state via at least one Hybrid Automatic Repeat Request, HARQ, feedback to the network node.

20 Claims, 4 Drawing Sheets

(51) Int. Cl.
  *H04W 76/27* (2018.01)
  *H04W 76/28* (2018.01)
  *H04W 76/40* (2018.01)

(56) References Cited

U.S. PATENT DOCUMENTS

| | | |
|---|---|---|
| 2021/0314098 A1 | 10/2021 | Liu et al. |
| 2023/0063082 A1* | 3/2023 | Zhou .................... H04W 72/30 |
| 2023/0104267 A1* | 4/2023 | Shrivastava .......... H04L 1/1822 370/329 |
| 2023/0224090 A1 | 7/2023 | Tseng |

OTHER PUBLICATIONS

"3rd Generation Partnership Project; Technical Specification Group Services and System Aspects; Study on architectural enhancements for 5G multicast-broadcast services; Phase 2 (Release 18)", 3GPP TR 23.700-47, V18.0.0, Dec. 2022, pp. 1-135.
"New WID: Enhancements of NR Multicast and Broadcast Services", 3GPP TSG RAN Meeting #94-e, RP-213568, Agenda: 8A.2, CATT, Dec. 6-17, 2021, 5 pages.
"PTM retransmission reception by UEs without HARQ feedback", 3GPP TSG-RAN WG2 Meeting #122, R2-2306392, Agenda: 6.2.2, Nokia, May 22-26, 2023, 5 pages.
"PTM retransmission reception by UEs without HARQ feedback", 3GPP TSG-RAN WG2 Meeting #122, R2-2306853, Agenda: 6.2.2, Nokia, May 22-26, 2023, 10 pages.
"User plane aspects of multicast reception in RRC_INACTIVE state", 3GPP TSG-RAN WG2 Meeting #123, R2-230xxxx, Agenda: 7.11.2.2, Nokia, Aug. 21-25, 2023, 4 pages.
"3rd Generation Partnership Project; Technical Specification Group Radio Access Network; NR; NR and NG-RAN Overall Description, Stage 2 (Release 16)", 3GPP TS 38.300, V16.6.0, Jun. 2021, pp. 1-152.
"3rd Generation Partnership Project; Technical Specification Group Radio Access Network; NG-RAN; Architecture description (Release 16)", 3GPP TS 38.401, V16.6.0, Jul. 2021, pp. 1-79.
"3rd Generation Partnership Project; Technical Specification Group Radio Access Network; Study on new radio access technology: Radio access architecture and interfaces (Release 14)", 3GPP TR 38.801, V14.0.0, Mar. 2017, pp. 1-91.
"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.
Office Action received for corresponding Finnish Patent Application No. 20235850, dated Dec. 14, 2023, 10 pages.
International Search Report and Written Opinion received for corresponding Patent Cooperation Treaty Application No. PCT/EP2024/064981, dated Sep. 30, 2024, 12 pages.
"Report of [AT119bis-e][605][eMBS] PTM configuration for Inactive (CATT)", 3GPP TSG-RAN WG2 #119-bis-e, R2-2210880, Agenda: 8.11.2, CATT, Oct. 10-19, 2022, 26 pages.

* cited by examiner

PTM RETRANSMISSION RECEPTION BY UES IN RRC_INACTIVE/IDLE WITH DRX

RELATED APPLICATION

This application was originally filed as a Patent Cooperation Treaty Application No. PCT/EP2024/064981 filed on May 31, 2024, which claims priority from Finnish national application No. 20235850 filed on Jul. 31, 2023, both of which are hereby incorporated by reference in their entirety.

TECHNOLOGY

The present disclosure relates to NR multicast/broadcast services, in particular to reception of Point-to-Multipoint transmissions at a user equipment.

BACKGROUND

Any discussion of the background art throughout the specification should in no way be considered as an admission that such art is widely known or forms part of common general knowledge in the field.

Rel-18 focuses on multicast reception by the UEs in RRC_INACTIVE state. Such UEs are expected to receive the same PDSCH transmissions that are received also by UEs in RRC_CONNECTED state receiving the same multicast service.

However, it is currently unclear how will an RRC_INACTIVE (/IDLE) UE be able to receive Point-to-Multipoint (PTM) retransmissions requested by RRC_CONNECTED UEs. As, UE in RRC_INACTIVE (/IDLE) does not send any HARQ feedback, how does such UE know when potential retransmission (requested by UEs in RRC_CONNECTED mode) may happen?

If DRX is configured for multicast, DRX retransmission timers should also be configured for the INACTIVE (/IDLE) UE as already proposed for connected UEs whose HARQ feedback is disabled. Even if the UE is configured with the DRX retransmission timers, it is not clear when to start the DRX HARQ RTT timer since the UE in inactive state or idle state does not send HARQ feedback, and the HARQ RTT timer is by definition started after sending HARQ feedback. Since the INACTIVE (/IDLE) UE is not configured with PUCCH resources and, therefore, may not understand HARQ feedback related parameters in DCI scheduling the PTM transmission and therefore does not know when DRX HARQ RTT timer should be started.

Related prior art is for instance:
3GPP Rel-15/16/17/18 specifications.
Nokia contribution on Rel-17 corrections R2-2306392 proposes to make DRX PTM retransmission timers configurable also for UEs whose HARQ feedback is disabled, so that those UEs could receive PTM retransmissions requested by other UEs whose HARQ feedback is not disabled. It also proposes that those UEs would start DRX HARQ RTT timer in case they know when the HARQ feedback should be transmitted (if it were enabled). The present disclosure focuses on another scenario, where the UEs in RRC_INACTIVE state or RRC IDLE state with no PUCCH resources configured are aimed to be able to receive retransmissions stemming from UEs in RRC_CONNECTED state.

Hence, there is a need to provide means for a UE in RRC_INACTIVE (/IDLE) to be able to receive retransmissions that are originated from RRC_CONNECTED UEs, when the UE is configured with DRX.

SUMMARY

In accordance with a first aspect of the present disclosure, there is provided a User Equipment, UE, comprising:
 at least one processor, and
 at least one memory storing instructions that, when executed by the at least one processor, cause the UE at least to, during or before a Multicast/Broadcast Service, MBS, session:
  receive, from a network node, a configuration message configuring at least one Retransmission Timer;
  receive, while the UE is in an inactive state or an idle state, a Physical Downlink Control Channel, PDCCH, transmission that is associated with the MBS session and that schedules a Transport Block, TB, of the MBS session with a group identifier identifying a group of UEs comprising the UE in the inactive or idle state and one or more UEs in a connected state;
  receive the scheduled TB in the inactive or idle state, via Point-To-Multipoint, PTM, Physical Downlink Shared Channel, PDSCH transmission associated with the MBS session; and
  in case of determining a failure in decoding the received TB:
   start the at least one Retransmission Timer based on the configuration message; and
   monitor, before the at least one Retransmission Timer expires, a PDCCH for at least one PTM retransmission for the failed TB requested by the one or more UEs in the connected state via at least one Hybrid Automatic Repeat Request, HARQ, feedback to the network node.

In some examples, the at least one Retransmission Timer comprises at least one of HARQ Round-Trip-Time, RTT, Timer and a Discontinuous Reception, DRX, Retransmission Timer,
 wherein the UE, in the inactive or idle state, is configured to:
 receive, via the PDCCH transmission, Downlink Control Information, DCI, comprising a timing indicator for indicating a time slot for the at least one HARQ feedback,
 start the HARQ RTT Timer after a predetermined symbol in the indicated time slot; and start the DRX Retransmission Timer after the HARQ RTT Timer expires. As described in greater detail below, The HARQ RTT Timer may be used to reduce unnecessary monitoring for the PTM retransmission. The duration of the HARQ RTT Timer may be based on an estimate of a round-trip-time between the UE and the network node, i.e. it may be understood to depict a minimum time for receiving the PTM retransmission.

In some examples, the monitoring is stopped based on the expiry of the Retransmission Timer.

In some examples:
 the indicated time slot comprises a plurality of symbols,
 the UE is pre-configured with a fixed number indicating a corresponding symbol comprised in the indicated time slot as the predetermined symbol that is default for all MBS sessions, or
 the configuration message further configures the UE with a specific number indicating a corresponding symbol of the indicated time slot as the predetermined symbol for a specific MBS session or default for all MBS sessions.

In some examples, the UE is configured to:
extend the configured DRX Retransmission Timer with at least one additional time slot, when the predetermined symbol is the first symbol in the indicated time slot.

In some examples, the configuration message is per Temporary Mobile Group Identity, TMGI, or a corresponding identifier identifying a specific multicast service or all multicast services of the group of UEs.

In some examples, the configuration message comprises information for further configuring the UE with a list of values for interpreting the timing indicator by reference to a value comprised in the list, and wherein the UE is configured to determine the time slot on the basis of the received timing indicator indicating one of the values of the list.

In some examples:
the configuration message comprises a full PUCCH configuration for the UE, and
the DCI comprises, in addition to the timing indicator, a PUCCH resource indicator, PRI, indicating the predetermined symbol comprised in the time slot indicated by the timing indicator for sending the at least one HARQ feedback.

In some examples, the timing indicator is a PDSCH-to-HARQ_feedback timing indicator, wherein the list is provided via dl-DataToUL-ACK parameter or dl-DataToUL-ACK-MulticastDCI-Format4-1 parameter or the list comprises values {1, 2, 3, 4, 5, 6, 7, 8}. These parameters can be found in the literature, e.g. 3GPP specifications for 5G New Radio.

In some examples, the UE is configured to, in the inactive or idle state, receive the same PDCCH transmission associated with the MBS session as the one or more UEs in connected state.

In some examples:
the PTM PDSCH transmission for the failed TB comprises a plurality of symbols,
wherein the UE is further caused to, in the inactive or idle state:
start the at least one Retransmission Timer after the last symbol comprised in the PTM PDSCH transmission for the failed TB.

In some examples:
the UE, in the inactive or idle state, is configured to receive, via the PDCCH transmission, Downlink Control Information, DCI, scheduling the failed TB transmission, wherein the DCI comprises information for indicating a time slot in which the HARQ feedback in response to the failed TB is sent by the one or more UEs in the connected state, wherein the UE is further caused to, in the inactive or idle state:
determine to start the at least one Retransmission Timer in the indicated time slot.

In some examples, the UE is further caused to:
before receiving the configuration message, receive from the network node a signaling message, comprising in particular an RRC release message, for being configured with a set of Retransmission Timers, each Retransmission Timer being configured for a corresponding cell serving the UE or for a corresponding MBS session;
receive the configuration message that indicates to the UE one Retransmission Timer from the set, the indicated Retransmission Timer;
and start the indicated Retransmission Timer.

In some examples, the configuration message is a Radio Resource Control, RRC, release message or an MBS Control Channel, MCCH, message.

In accordance with a second aspect of the present disclosure, there is provided a network node of a radio access network, configured to establish communication to a group of UEs, the group being identified by a group identifier, the network node comprising:
at least one processor, and
at least one memory storing instructions that, when executed by the at least one processor, cause the network node at least to, during or before a Multicast/Broadcast Service, MBS, session:
transmit a configuration message to at least one of said plurality of Ues for configuring the at least one UE with at least one Retransmission Timer, wherein the at least one UE is in an inactive state or an idle state and at least one UE is in connected state;
schedule, via one or more Physical Downlink Control Channel, PDCCH, transmissions associated with the MBS session, a Transport Block, TB, towards the group of Ues identified by the group identifier;
transmit the scheduled TB, via Point-To-Multipoint, PTM, Physical Downlink Shared Channel, PDSCH associated with the MBS session, to the group of Ues identified by the group identifier;
determine resources for retransmissions for the transmitted TB in response to receiving at least one Hybrid Automatic Repeat Request, HARQ, feedback from the at least one UE in connected state indicating a failure in decoding the TB; and initiate retransmissions for the failed TB at the determined resources and based on the at least one Retransmission Timer configured for the at least one UE in inactive or idle state,
wherein the configuration message comprises information for the at least one UE in inactive or idle state to determine when to start the at least one Retransmission Timer based on the configuration message.

In some examples, the at least one Retransmission Timer comprises at least one of HARQ Round-Trip-Time, RTT, Timer and a Discontinuous Reception, DRX, Retransmission Timer,
wherein the network node is further caused to:
transmit to the at least one UE in inactive or idle state, via the PDCCH transmission, Downlink Control Information, DCI, comprising a timing indicator for indicating a time slot for the at least one HARQ feedback,
wherein the configuration message comprises information for further configuring the at least one UE to determine to start the HARQ RTT Timer after a predetermined symbol in the indicated time slot.

As described in greater detail below, The HARQ RTT Timer may be used to reduce unnecessary monitoring for the PTM retransmission. The duration of the HARQ RTT Timer may be based on an estimate of a round-trip-time between the UE and the network node, i.e. it may be understood to depict a minimum time for receiving the PTM retransmission.

In some examples, the configuration message comprises information for further configuring the at least one UE to stop the monitoring based on the expiry of the Retransmission Timer.

In some examples, the indicated time slot comprises a plurality of symbols, and the network node is further caused to pre-configure the at least one UE with a fixed number indicating a corresponding symbol comprised in the indicated time slot as the predetermined symbol that is default for all MBS sessions; or the configuration message further configures the at least one UE with a specific number indicating a corresponding symbol of the indicated time slot as the predetermined symbol for a specific MBS session or default for all MBS sessions.

In some examples, the network node is configured to:
indicate the at least one UE to extend the configured DRX Retransmission Timer with one additional time slot, when the predetermined symbol is the first symbol in the indicated time slot.

In some examples, the network node is further caused to:
transmit the configuration message per Temporary Mobile Group Identity, TMGI, or a corresponding identifier identifying a specific multicast service or all multicast services transmitted to group of Ues.

In some examples, the configuration message comprises information for further configuring the at least one UE with a list of values for interpreting the timing indicator by reference to a value comprised in the list, and wherein the at least one UE is configured to determine the time slot on the basis of the received timing indicator indicating one of the values of the list.

In some examples:
the configuration message comprises a full PUCCH configuration, and
the DCI comprises, in addition to the timing indicator, a PUCCH resource indicator, PRI, indicating the predetermined symbol comprised in the time slot indicated by the timing indicator for sending the at least one negative HARQ feedback.

In some examples, the timing indicator is a PDSCH-to-HARQ_feedback timing indicator, wherein the list is provided via dl-DataToUL-ACK parameter or dl-DataToUL-ACK-MulticastDCI-Format4-1 parameter or the list comprises values {1, 2, 3, 4, 5, 6, 7, 8}. These parameters can be found in the literature, e.g. 3GPP specifications for 5G New Radio.

In some examples, the network node is configured to provide the same PDCCH transmission associated with the MBS session to the at least one UE in inactive or idle state as for the remaining Ues in connected state.

In some examples:
the PTM PDSCH transmission for the failed TB comprises a plurality of symbols; and
the network node is caused to instruct the at least one UE to, in inactive or idle state:
start the at least one Retransmission Timer after the last symbol comprised in the PTM PDSCH transmission for the failed TB.

In some examples, the network node is further caused to transmit to the at least one UE in inactive or idle state, via the PDCCH transmission, Downlink Control Information, DCI, scheduling the failed TB transmission, wherein the DCI comprises a timing indicator information for indicating a time slot in which the at least one HARQ feedback in response to the failed TB is sent by the remaining Ues in the connected state; and
the network node is caused to instruct the at least one UE to, in inactive or idle state:
determine to start the at least one Retransmission Timer in the indicated time slot.

In some examples, the network node is further caused to: before transmitting the configuration message, transmit to the at least one UE a signaling message, comprising in particular an RRC release message, for configuring the at least one UE with a set of Retransmission Timers, each Retransmission Timer being configured for a corresponding cell serving the at least one UE or a corresponding MBS session; and
instruct the at least one UE to select one Retransmission Timer from the set.

In some examples, the configuration message is a Radio Resource Control, RRC, release message or an MBS Control Channel, MCCH message.

In accordance with a third aspect of the present disclosure, there is provided a system, configured for supporting Multicast/Broadcast Services, MBS, the system comprising:
a group of User Equipments, Ues, comprising a UE in accordance with the first aspect and its associated examples and one or more Ues in connected state that are configured to support Hybrid Automatic Repeat Request, HARQ, process, the group being identified by a group identifier; and
a network node in accordance with the second aspect and its associated examples, configured to schedule and transmit, towards the group, data associated with the MBS.

In accordance with a fourth aspect of the present disclosure, there is provided a method of a User Equipment, UE, during or before a Multicast/Broadcast Service, MBS, session:
receiving, from a network node, a configuration message configuring at least one Retransmission Timer;
receiving, while the UE is in an inactive state or an idle state, a Physical Downlink Control Channel, PDCCH, transmission that is associated with the MBS session and that schedules a Transport Block, TB, of the MBS session with a group identifier identifying a group of Ues comprising the UE in the inactive or idle state and one or more Ues in a connected state;
receiving the scheduled TB in the inactive or idle state, via Point-To-Multipoint, PTM, Physical Downlink Shared Channel, PDSCH transmission associated with the MBS session; and
in case of determining a failure in decoding the received TB:
starting the at least one Retransmission Timer based on the configuration message; and
monitoring, before the at least one Retransmission Timer expires, the PDCCH for at least one PTM retransmission for the failed TB requested by the one or more UEs in the connected state via at least one Hybrid Automatic Repeat Request, HARQ, feedback to the network node.

In accordance with a fifth aspect of the present disclosure, there is provided a method of a network node of a radio access network, configured to establish communication to a group of UEs, the group being identified by a group identifier, the method comprising, during or before a Multicast/Broadcast Service, MBS, session:
transmitting a configuration message to at least one of said plurality of UEs for configuring the at least one UE with at least one Retransmission Timer, wherein the at least one UE is in an inactive state or an idle state and the remaining UEs are in connected state;
scheduling, via one or more Physical Downlink Control Channel, PDCCH, transmissions associated with the MBS session, a Transport Block, TB, towards the group of UEs identified by the group identifier;
transmitting the scheduled TB, via Point-To-Multipoint, PTM, Physical Downlink Shared Channel, PDSCH associated with the MBS session, to the group of UEs identified by the group identifier;

determining resources for retransmissions for the transmitted TB in response to receiving at least one Hybrid Automatic Repeat Request, HARQ, feedback from the remaining UEs in connected state indicating a failure in decoding the TB at the group of UEs; and initiating retransmissions for the failed TB at the determined resources and based on the at least one Retransmission Timer configured for the at least one UE in the inactive or idle state, wherein the configuration message comprises information for the at least one UE in inactive or idle state to determine when to start the at least one Retransmission Timer based on the configuration message.

In accordance with a sixth aspect of the present disclosure, there is provided a computer program comprising instructions for causing an apparatus to perform the method according to the fourth aspect, or for causing an apparatus to perform the method according to the fifth aspect.

In accordance with a seventh aspect of the present disclosure, there is provided a memory storing computer readable instructions for causing an apparatus to perform the method according to the fourth aspect, or for causing an apparatus to perform the method according to the fifth aspect.

In addition, according to some other example embodiments, there is provided, for example, a computer program product for a wireless communication device comprising at least one processor, including software code portions for performing the respective steps disclosed in the present disclosure, when said product is run on the device. The computer program product may include a computer-readable medium on which said software code portions are stored. Furthermore, the computer program product may be directly loadable into the internal memory of the computer and/or transmittable via a network by means of at least one of upload, download and push procedures.

While some example embodiments will be described herein with particular reference to the above application, it will be appreciated that the present disclosure is not limited to such a field of use, and is applicable in broader contexts.

Notably, it is understood that methods according to the present disclosure relate to methods of operating the apparatuses according to the above example embodiments and variations thereof, and that respective statements made with regard to the apparatuses likewise apply to the corresponding methods, and vice versa, such that similar description may be omitted for the sake of conciseness. In addition, the above aspects may be combined in many ways, even if not explicitly disclosed. The skilled person will understand that these combinations of aspects and features/steps are possible unless it creates a contradiction which is explicitly excluded.

Implementations of the disclosed apparatuses may include using, but not limited to, one or more processor, one or more application specific integrated circuit (ASIC) and/or one or more field programmable gate array (FPGA). Implementations of the apparatus may also include using other conventional and/or customized hardware such as software programmable processors, such as graphics processing unit (GPU) processors.

Other and further example embodiments of the present disclosure will become apparent during the course of the following discussion and by reference to the accompanying drawings.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Figure 1:
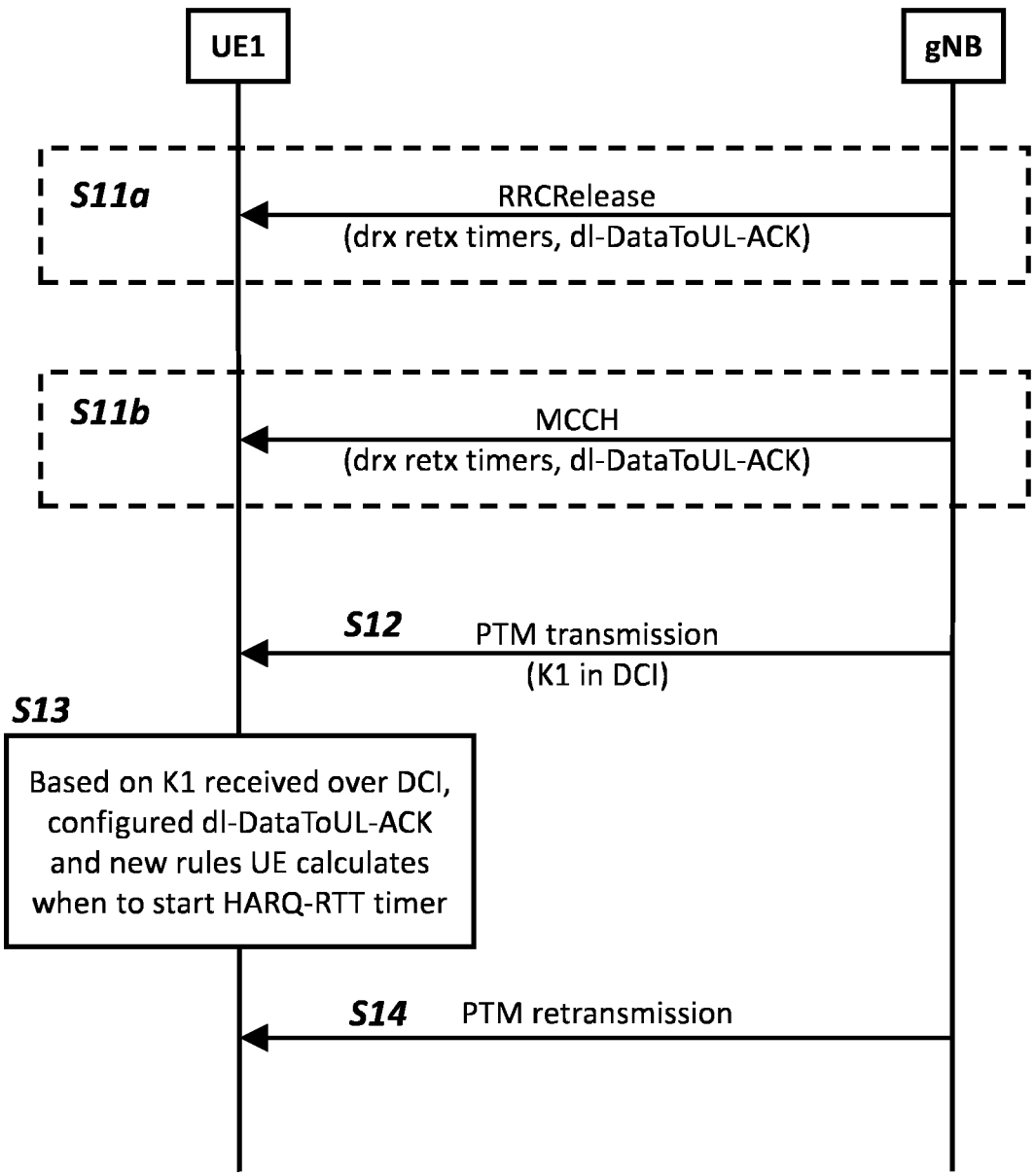
FIG. 1 schematically illustrates an example of a signaling diagram for PTM (re-)transmission according to an example embodiment of the present disclosure.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is apparent for a person skilled in the art that the embodiments may also be applied to other kinds of communication networks where mobile communication principles are integrated with a D2D (device-to-device) or V2X (vehicle to everything) configuration, such as SL (side link), e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules, etc., that have not been specifically mentioned.

A basic system architecture of a (tele) communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed unit (DU) or a centralized/central unit (CU), which controls a respective coverage area or cell(s) and with which one or more communication stations such as communication elements or functions, like user devices or terminal devices, like a user equipment (UE), or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The following description may provide further details of alternatives, modifications and variances: a gNB comprises e.g., a node providing NR user plane and control plane protocol terminations towards the UE, and connected via the NG interface to the 5GC, e.g., according to 3GPP TS 38.300 V16.6.0 (2021-06) section 3.2 incorporated by reference.

A gNB Central Unit (gNB-CU) comprises e.g., a logical node hosting e.g., RRC, SDAP and PDCP protocols of the gNB or RRC and PDCP protocols of the en-gNB that controls the operation of one or more gNB-DUs. The gNB-CU terminates the F1 interface connected with the gNB-DU.

A gNB Distributed Unit (gNB-DU) comprises e.g., a logical node hosting e.g., RLC, MAC and PHY layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU.

A gNB-CU-Control Plane (gNB-CU-CP) comprises e.g., a logical node hosting e.g., the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

A gNB-CU-User Plane (gNB-CU-UP) comprises e.g., a logical node hosting e.g., the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU, e.g., according to 3GPP TS 38.401 V16.6.0 (2021-07) section 3.1 incorporated by reference.

Different functional splits between the central and distributed unit are possible, e.g., called options:

Option 1 (1A-like split):
The function split in this option is similar to the 1A architecture in DC. RRC is in the central unit. PDCP, RLC, MAC, physical layer and RF are in the distributed unit.

Option 2 (3C-like split):
The function split in this option is similar to the 3C architecture in DC. RRC and PDCP are in the central unit. RLC, MAC, physical layer and RF are in the distributed unit.

Option 3 (intra RLC split):
Low RLC (partial function of RLC), MAC, physical layer and RF are in the distributed unit. PDCP and high RLC (the other partial function of RLC) are in the central unit.

Option 4 (RLC-MAC split):
MAC, physical layer and RF are in the distributed unit. PDCP and RLC are in the central unit.

Or else, e.g., according to 3GPP TR 38.801 V14.0.0 (2017-03) section 11 incorporated by reference.

A gNB supports different protocol layers, e.g., Layer 1 (L1)-physical layer.

The layer 2 (L2) of NR is split into the following sublayers: Medium Access Control (MAC), Radio Link Control (RLC), Packet Data Convergence Protocol (PDCP) and Service Data Adaptation Protocol (SDAP), where e.g.:
The physical layer offers to the MAC sublayer transport channels;
The MAC sublayer offers to the RLC sublayer logical channels;
The RLC sublayer offers to the PDCP sublayer RLC channels;
The PDCP sublayer offers to the SDAP sublayer radio bearers;
The SDAP sublayer offers to 5GC QoS flows;
Comp. refers to header compression and Segm. To segmentation;
Control channels include (BCCH, PCCH).

Layer 3 (L3) includes e.g., Radio Resource Control (RRC), e.g., according to 3GPP TS 38.300 V16.6.0 (2021-06) section 6 incorporated by reference.

A RAN (Radio Access Network) node or network node like e.g. a gNB, base station, gNB CU or gNB DU or parts thereof may be implemented using e.g. an apparatus with at least one processor and/or at least one memory (with computer-readable instructions (computer program)) configured to support and/or provision and/or process CU and/or DU related functionality and/or features, and/or at least one protocol (sub-) layer of a RAN (Radio Access Network), e.g. layer 2 and/or layer 3.

The gNB CU and gNB DU parts may e.g., be co-located or physically separated. The gNB DU may even be split further, e.g., into two parts, e.g., one including processing equipment and one including an antenna. A Central Unit (CU) may also be called BBU/REC/RCC/C-RAN/V-RAN, O-RAN, or part thereof. A Distributed Unit (DU) may also be called RRH/RRU/RE/RU, or part thereof. Hereinafter, in various example embodiments of the present disclosure, the CU-CP (or more generically, the CU) may also be referred to as a (first) network node that supports at least one of central unit control plane functionality or a layer 3 protocol of a radio access network; and similarly, the DU may be referred to as a (second) network node that supports at least one of distributed unit functionality or the layer 2 protocol of the radio access network.

A gNB-DU supports one or multiple cells, and could thus serve as e.g., a serving cell for a user equipment (UE).

A user equipment (UE) may include a wireless or mobile device, an apparatus with a radio interface to interact with a RAN (Radio Access Network), a smartphone, an in-vehicle apparatus, an IoT device, a M2M device, or else. Such UE or apparatus may comprise: at least one processor; and at least one memory including computer program code; wherein the at least one memory and the computer program code are configured to, with the at least one processor, cause the apparatus at least to perform certain operations, like e.g. RRC connection to the RAN. A UE is e.g., configured to generate a message (e.g., including a cell ID) to be transmitted via radio towards a RAN (e.g., to reach and communicate with a serving cell). A UE may generate and transmit and receive RRC messages containing one or more RRC PDUs (Packet Data Units).

The UE may have different states (e.g., according to 3GPP TS 38.331 V16.5.0 (2021-06) sections 42.1 and 4.4, incorporated by reference).

A UE is e.g., either in RRC_CONNECTED state or in RRC_INACTIVE state when an RRC connection has been established.

In RRC_CONNECTED state a UE may:
store the AS context;
transfer unicast data to/from the UE;
monitor control channels associated with the shared data channel to determine if data is scheduled for the data channel;
provide channel quality and feedback information;
perform neighboring cell measurements and measurement reporting.

The RRC protocol includes e.g. the following main functions:
RRC connection control;
measurement configuration and reporting;
establishment/modification/release of measurement configuration (e.g. intra-frequency, inter-frequency and inter-RAT measurements);
setup and release of measurement gaps;
measurement reporting.

The general functions and interconnections of the described elements and functions, which also depend on the actual network type, are known to those skilled in the art and described in corresponding specifications, so that a detailed description thereof may omitted herein for the sake of conciseness. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station/BS, a gNB, a radio network controller, a core network control element or function, such as a gateway element, or other network elements or functions, as described herein, and any other elements, functions or applications may be implemented by software, e.g., by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors. It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

As illustrated above, the present disclosure generally seeks to provide means for a UE in RRC_INACTIVE (/IDLE) to be able to receive retransmissions that are originated from RRC_CONNECTED UEs, when the UE is configured with DRX.

In Rel-17, NR multicast/broadcast services (MBS) allowed for the UE to only receive multicast in RRC_CONNECTED state. Herein, Point-to-Multipoint (PTM) transmissions are efficiently provisioning MBS services to multiple users by using the same radio framework as unicast transmission. Rel-17 enabled the reception of a multicast service by the UEs in RRC_CONNECTED state, only. Reliability of the data reception is ensured via HARQ retransmissions and dynamic MCS selection even for PTM operation. Furthermore, PTP transmissions can also be configured for UEs in RRC_CONNECTED.

Rel-18 started with SA2 SI (SP-211645) on identifying and evaluating further enhancements to the 5GS architecture to provide multicast and broadcast services. Currently, the normative work is starting to finalize the agreed solutions in TR 23.700-47. The main focus in SA2 SI has been the KI #1 that focuses on enabling reception of multicast services by the UEs in RRC_INACTIVE state for scalability and power saving purposes:

KI #1: How to enable support for and enhancement related to end-to-end MBS traffic delivery for, including large number of UEs:

Enabling UE's receiving Multicast MBS Session data in RRC states in RRC Inactive state.

Following the work of SA2, the RAN WID RP-213568 has been agreed for Rel-18, which includes the following objective:

Specify support of multicast reception by UEs in RRC_INACTIVE state [RAN2, RAN3]
PTM configuration for UEs receiving multicast in RRC_INACTIVE state [RAN2]
Study the impact of mobility and state transition for UEs receiving multicast in RRC_INACTIVE. (Seamless lossless mobility is not required) [RAN2, RAN3]

In case a UE is in RRC_INACTIVE state, it shall apply the configuration of the multicast service in the cell to start/continue receiving a multicast service the UE has joined. How the configuration shall be performed is currently studied by RAN2/3.

One option agreed is to provide the configuration using a method similar to Rel-17 broadcast, i.e., the cell broadcasts SIB/MCCH (multicast control channel) periodically, so that the RRC_INACTIVE UEs can receive the configuration itself and any updates to that. Furthermore, the UE can be given the configuration of receiving the multicast service in RRC_INACTIVE state while camping at the serving cell, when UE is sent from RRC_CONNECTED to RRC_INACTIVE. This sending of the UE from RRC_CONNECTED to RRC_INACTIVE is performed via an RRC release message including a suspendConfig.

Moreover, it was agreed that at least in some scenarios there will be UEs in RRC_CONNECTED and RRC_INACTIVE state simultaneously receiving the same multicast data (PDSCH) and possibly the same PDCCH that schedules the data.

For Rel-17 MBS multicast in RRC_CONNECTED, UE can be configured with discontinuous reception (DRX) for reception of MBS multicast services to save UE power. DRX operation uses two configurable timers, DRX HARQ/Hybrid ARQ RTT (round trip time) timer and DRX retransmission timer (these timers are purely configured by gNB to each UE), to indicate to the UE when to monitor for potential PTM retransmissions. The operation is summarized here:

1—There is a PDSCH transmission received by the UE (e.g., PTM).
2—The UE is normally configured with HARQ feedback and indicated the PUCCH (Physical Uplink Control Channel) resource it will use for HARQ feedback.
3—UE transmits HARQ feedback on PUCCH and at the end of the PUCCH symbol it starts the DRX HARQ RTT timer (e.g. if PUCCH comprises symbols 3 to 5 of a slot, the timer is started at the end of symbol 5).
Note that, long PUCCH format 1 and format 3 are usually 14 symbols. A short PUCCH has two symbols which is usually located at the end of the slot but spec allows also other locations.
4—When the RTT timer expires, then the UE starts DRX retransmission timer if the reception (decoding) of PUSCH for the corresponding HARQ process was not successful, and while the DRX retransmission timer is running, the UE monitors PDCCH for reception of retransmission.

In Rel-17 these HARQ retransmission related timers are only configured if HARQ feedback is enabled for the UE.

Parameter K1 (PDSCH-to-HARQ_feedback timing indicator) in the DCI (downlink control information)/PDCCH is pointing to PUCCH resource's slot where the HARQ feedback is supposed to be sent (if enabled). Another parameter in DCI is PRI (PUCCH resource indicator) which then selects which PUCCH resources (symbol(s) and frequency resources) to use in that slot. The interpretation of K1 and PRI are configured to an UE in the connected mode but not to an UE in the inactive/idle mode. Therefore, UE in inactive/idle mode does not know when the HARQ feedback would be transmitted if enabled and, therefore, does not know when to start the DRX HARQ RTT timer.

Note that, number of PUCCH resources can be different depending on the number of orthogonal color code (OCC), number of symbols (short or long PUCCH), number of PRBs, and cyclic shift. So, PRI will point out to one of those PUCCH resources configured in PUCCH resource set.

One possible solution is to configure UEs in RRC_INACTIVE/IDLE with full PUCCH configuration, such that UE would have the same information as the UE in the active mode and thus know exactly when the HARQ feedback should be sent if it were enabled. Then based on the configuration and information received via DCI, the UE in the inactive/idle mode would know exactly when to start the HARQ RTT timer that, upon expiry, activates the DRX Retransmission Timer for receiving a potential HARQ PTM retransmission. This would require additional configuration with the only purpose to receive the potential PTM retransmission which, while enabling the appropriate start of the HARQ RTT timer, also increases signaling overhead. Furthermore, interpretation of PRI depends on the actual HARQ feedback size to be produced. Therefore, this approach would require more computation also at the UE side to produce a HARQ feedback.

Note that in case of ACK/NACK feedback, UE picks the "PUCCH resource set" based on the size of the HARQ feedback it wants to send. Then PRI points to right PUCCH resource (PRB(s)) in that PUCCH resource set. There can be up to 4 PUCCH resource sets. This means that different UEs receiving the same multicast transmission may send ACK/NACK feedback at different time or at different symbols.

In view of the above, it is proposed in accordance with the present disclosure that instead of configuring the UE in the inactive/idle (RRC_INACTIVE/IDLE) mode with the full PUCCH configuration:

parameter dl-DataToUL-ACK-MulticastDCI-Format4-1 or dl-DataToUL-ACK may be configured also for UE in the inactive/idle state, i.e., it may be provided by MCCH or via RRCRelease message to the UE, which could be per TMGI (MBS service) or a general one for all multicast services.
Note that DCI formats 4_1 and 4_2 are used to schedule multicast data. For each of them, a list can be configured, i.e., dl-DataToUL-ACK-MulticastDCI-Format4-1 or dl-DataToUL-ACK, respectively. K1=x in the DCI sent is mapped to this list's x'th row to understand the slot (=timing) of PUCCH.
then UE can use the existing rules for interpreting K1 (PDSCH-to-HARQ_feedback timing indicator): For DCI format 4_1, the PDSCH-to-HARQ_feedback timing indicator field (K1) values are provided by dl-DataToUL-ACK-MulticastDCI-Format4-1 or, if dl-DataToUL-ACK-MulticastDCI-Format4-1 is not provided, by {1, 2, 3, 4, 5, 6, 7, 8}.
For instance:
K1=2
dl-DataToUL-ACK-MulticastDCI-Format4-1 or dl-DataToUL-ACK={2,4,6,8,10,12,14,16}

PRI=2

PUCCH configuration→several PUCCH resources that UE can use in the future for sending HARQ feedback Frequency domain:
  Between 5.2 MHz and 5.25 MHz there is PUCCH resource 1
  Between 5.25 MHz and 5.30 MHz there is PUCCH resource 2

Based on K1 UE already knows the slot where the HARQ feedback would be transmitted, but not the exact symbol. In order to know the symbol, UE should in practice be configured with full PUCCH configuration (as in the example above). Therefore, it is proposed in accordance with the present disclosure, instead of configuring the UE in in the inactive/idle mode with the full PUCCH configuration:

- The UE is configured with a new rule for starting the DRX HARQ RTT timer: UE always starts the timer in the nth symbol of the slot indicated by K1, where n could be configurable or fixed in standard (e.g., always after the 1st symbol of the slot, or always after the last symbol of the slot). That is, if the configuration of n is not provided to the UE, then UE could use the fixed values of the symbols and if the configuration is given, the UE could use the configured value of n. The new rule is provided either via the same configuration (RRC release and/or MCCH) or it is preconfigured value at the UE, e.g., always 1 hardcoded by the standard.
- A network node (e.g. an access node such as the gNB) may schedule retransmissions taking into account the knowledge when inactive/idle UEs have started DRX HARQ RTT timer (network has to do this anyway since different UEs may send ACK/NACK for PTM transmission in different symbols). In particular, the network node may ensure that the retransmissions are scheduled when the UEs are expecting for them, i.e., when the retransmission timer is running.
- alternatively (especially if HARQ RTT timer is always started after the first symbol of the slot), the UE could be required to extend the duration of the configured drx-RetransmissionTimerDL-PTM by one slot to guarantee that all potential PTM retransmissions are received. As the UE possibly is starting the RTT timer in the first symbol but other UEs in RRC_CONNECTED may start e.g. in last symbol, the UE may need 1 slot bigger retransmission timer to cover the difference.

The proposed solution thus reduces the amount of signaling because the full PUCCH configuration can be omitted. As known from the 3GPP specifications, the full PUCCH configuration includes various parameters related to resources, formats, power control, etc. Depending on the embodiment, only one PUCCH parameter may be sufficient for the appropriate configuration of the retransmission timer, e.g. dl-DataToUL-ACK-MulticastDCI-Format4-1 or dl-DataToUL-ACK, as described herein.

Another solution in accordance with the present disclosure is to specify a new "drx-InactiveRetranmissionTimerDL-PTM" timer that indicates a maximum time that UE shall expect to receive a retransmission after successful reception of PDCCH and unsuccessful decoding of the TB on the PDSCH associated with MBS session. In this alternative, the UE starts the retransmission timer, without RTT timer, in the slot that is indicated by K1. During that timer period, UE will expect retransmissions. The UE who could not receive a packet will trigger this timer and thus extend its Active Time if (provided it has sufficient power). The timer is triggered immediately after the time slot indicated by K1 in the decoded DCI. Note that, the timer can be a cell specific or MBS session specific. In an embodiment, the timer is configured through a broadcast message like MCCH.

Alternatively, in accordance with the present disclosure, the new timer drx Inactive RetransmissionTimerDL-PTM could be started immediately after receiving or decoding of the PDSCH. The benefit would be that then inactive UE would not need to interpret K1. The drawback would be a slightly increased power consumption. In this alternative, the UE starts the retransmission timer, without RTT timer, right after the end of PDSCH that is not successfully decoded. During that timer period, UE will expect retransmissions.

Alternatively, in accordance with the present disclosure, gNB shall specify a set of multiple "Inactive-Retransmission TimerDL-PTM" timers. Each timer within the timer set can be configured for a specific cell or MBS session. The set of timers can be configured through dedicated signaling, e.g., RRC release. gNB then signals a timer from the timer set using a few bits in a broadcast message, e.g. on the MCCH, enabling the UE in an inactive/idle state to select the corresponding timer. For example, when the timer set contains eight timers, only three bits in MCCH are sufficient to address the corresponding timer to the UE. The set of timers should be coordinated between the cells so that a UE that reselects a new cell can understand MCCH.

References are now made to the figures. In particular, it is to be noted that identical or like reference numbers used in the figures of the present disclosure may, unless indicated otherwise, indicate identical or like elements, such that repeated description thereof may be omitted for reasons of conciseness.

Solution 1:

FIG. 1 schematically illustrates an example of a signaling diagram for PTM (re-)transmission according to an example embodiment of the present disclosure, comprising in particular the following method steps.

- Step S11: UE is configured with DRX retransmission timers and dl-DataToUL-ACK either via dedicated RRC (S11a), e.g., RRCRelease, or via MCCH (S11b).
  Note that DCI formats 4_1 and 4_2 are used to schedule multicast data. For each of them, a list can be configured, i.e., dl-DataToUL-ACK-MulticastDCI-Format4-1 or dl-DataToUL-ACK, respectively. K1=x in the DCI sent is mapped to this list's x'th row to understand the slot (=timing) of PUCCH.
- Step S12: A PTM transmission is scheduled via DCI sent over group common PDCCH addresses to G-RNTI (or G-CS-RNTI), DCI includes K1, UE receives PDCCH but does not decode transport block sent over PDSCH correctly.
- Step S13: Based on K1 received over DCI, the configured dl-DataToUL-ACK and new rules, UE determines when to start drx-HARQ-RTT-Timer (which upon expiry triggers drx-RetransmissionTimer during which UE monitors the group common PDCCH addressed to G-RNTI for potential PTM retransmissions).
  New rule for starting DRX HARQ RTT timer: UE always starts the timer in the nth symbol of the slot indicated by K1, where n could be configurable or fixed in standard (e.g., always after the 1st symbol of the slot, or always after the last symbol of the slot). That is, if the configuration of n is not provided to the UE, then UE could use the fixed values of the symbols and if the configuration is given, the UE could use the configured value of n.

Network node may schedule retransmissions taking into account when inactive/idle UEs have started DRX HARQ RTT timer (network has to do this anyway since different UEs may send ACK/NACK for PTM transmission in different symbols).

Alternatively (e.g. if HARQ RTT timer is always started after the first symbol of the slot), the UE may extend the duration of the configured drx-RetransmissionTimerDL-PTM by one slot to guarantee that all potential PTM retransmission occasions will be monitored. This alternative is provided preferably as a fixed option that could be there without explicit enabling/disabling.

Step S14: UE monitors PDCCH during drx-RetransmissionTimer for potential PTM retransmission and stops the monitoring upon expiry of the drx-Retransmission Timer.

A slot contains 14 symbols. And normally based on PUCCH configuration, each PUCCH resource is located in some symbols e.g., PUCCH resource 1 could be in 3rd to 5th symbol of a slot. And normally UE starts the first retransmission timer after 5th symbol after sending PUCCH in this resource.

Figure 2:
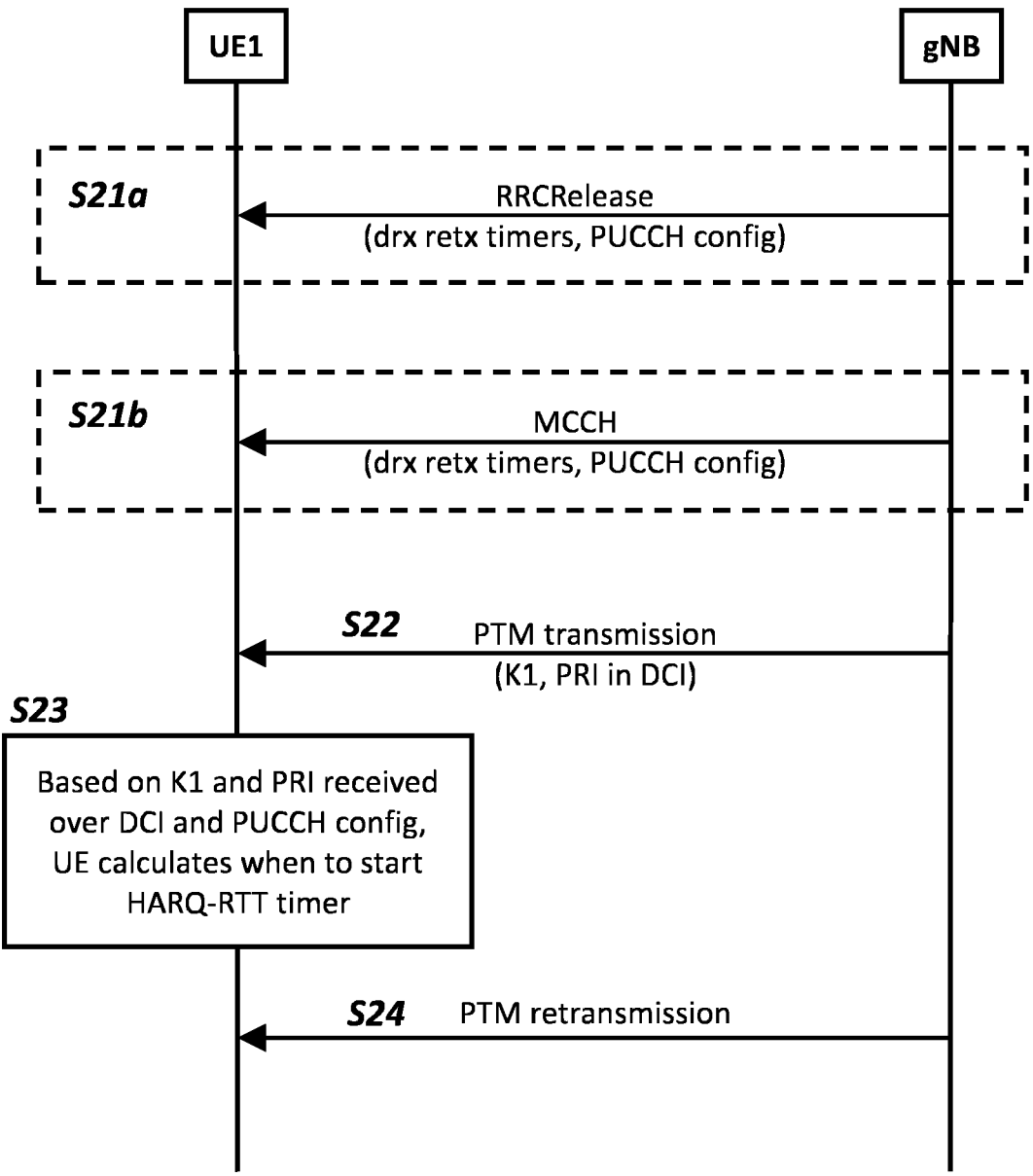
FIG. 2 schematically illustrates an example of a signaling diagram for PTM (re-)transmission according to an example embodiment of the present disclosure.

Solution 2:

FIG. 2 schematically illustrates an example of a signaling diagram (re-)transmission according to an example embodiment of the present disclosure, comprising in particular the following method steps.

Step S21: UE is configured with DRX retransmission timers and a full PUCCH configuration either via dedicated RRC (S21a), e.g., RRCRelease, or via MCCH (S21b). By full PUCCH configuration, it is intended to represent the PUCCH configuration that the UE normally uses in RRC_CONNECTED state for providing HARQ feedback upon multicast data transmissions.

Step S22: A PTM transmission is scheduled via DCI sent over group common PDCCH addresses to G-RNTI (or G-CS-RNTI), DCI includes K1 and PRI, UE receives PDCCH but does not decode transport block sent over PDSCH correctly.

Step S23: Based on K1 and PRI received over DCI, the configured PUCCH config, UE determines when to start drx-HARQ-RTT-Timer (which upon expiry triggers drx-RetransmissionTimer during which UE monitors the group common PDCCH addressed to G-RNTI for potential PTM retransmissions).

Step S24: UE monitors PDCCH during drx-RetransmissionTimer for potential PTM retransmission and stops the monitoring upon expiry of the drx-Retransmission Timer.

Figure 3:
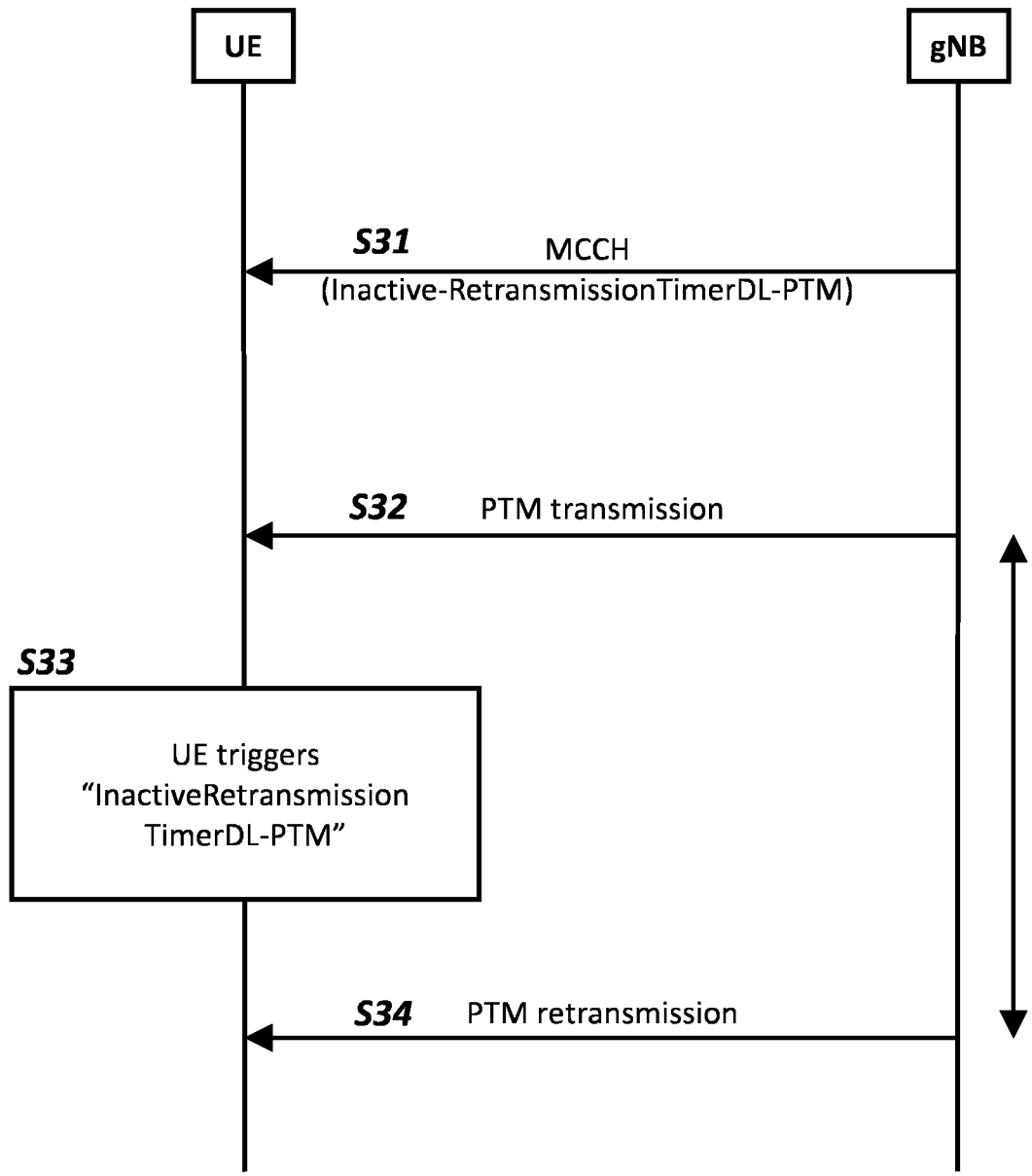
FIG. 3 schematically illustrates examples of a signaling diagram for PTM (re-)transmission according to an example embodiment of the present disclosure.

Solution 3:

FIG. 3 schematically illustrates an example of a signaling diagram (re-)transmission according to an example embodiment of the present disclosure, comprising in particular the following method steps.

Step S31: gNB configures an drx-Inactive Retransmission TimerDL-PTM via an MCCH message.

Step S32: gNB starts the PTM transmission to the UEs.

Step S33: UE was able to decode PDCCH but could not decode a TB on the PDSCH channel and thus triggers the drx-Inactive Retransmission TimerDL-PTM timer indicated by MCCH.

Step S34: UE monitors PDCCH during drx-Inactive Retransmission TimerDL-PTM for potential PTM retransmission and stops the monitoring upon expiry of the drx-Inactive Retransmission TimerDL-PTM.

In this alternative, the UE starts the retransmission timer, without RTT timer, in the slot that is indicated by K1. During that timer period, UE will expect retransmissions.

In another alternative, the UE starts the retransmission timer, without RTT timer, right after the end of PDSCH that is not successfully decoded. During that timer period, UE will expect retransmissions.

Figure 4:
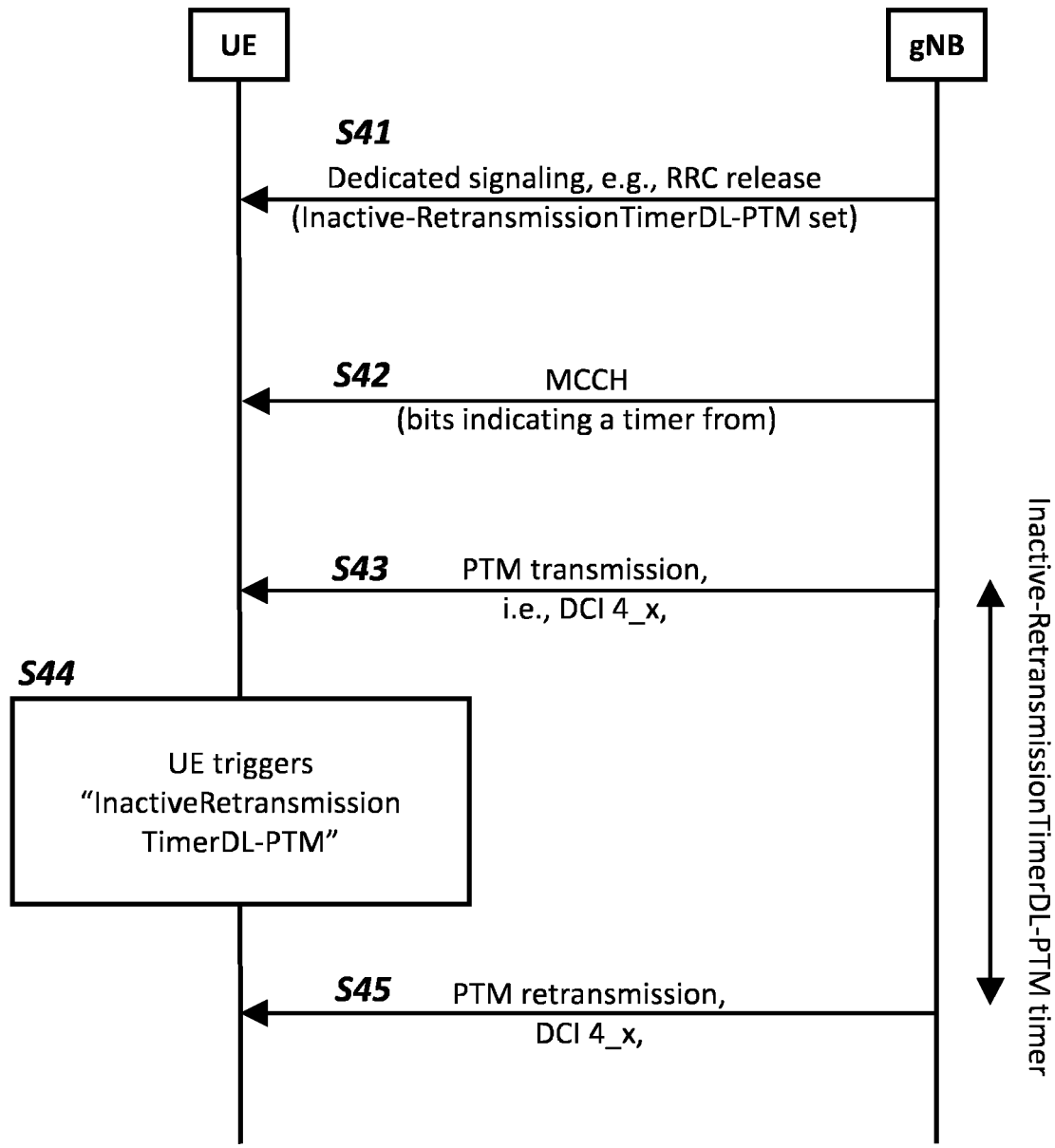
FIG. 4 schematically illustrates an example of a signaling diagram for PTM (re-)transmission according to an example embodiment of the present disclosure.

Solution 4:

FIG. 4 schematically illustrates an example of a signaling diagram (re-)transmission according to an example embodiment of the present disclosure, comprising in particular the following method steps.

Step S41: gNB configures a set of inactive re-transmission timers via dedicated signaling.

Step S42: gNB signals a bit in MCCH, indicating a re-transmission timer of the set of inactive re-transmission timers to be configured to UE in an inactive/idle state.

Step S43: UE could decode PDCCH but was not able to decode a TB on the PDSCH channel.

Step S44: UE triggers the indicated re-transmission timer, expecting to receive the re-transmission when the timer is still running.

Step S45: UE monitors PDCCH during the triggered re-transmission timer for potential PTM retransmission and stops the monitoring upon expiry of the re-transmission timer.

In summary, UE should be receiving both RTT timer and retransmission timer in Solution 1 and 2. UE should be receiving a new combined retransmission timer (in principle in place of RTT and retransmission timers combined) in Solution 3.

Further, for all of the above solutions, the UE may be configured during an MBS session, or before the session actually starts. Preferably, the steps described in the above figures relate to the same MBS.

In addition, the G-RNTI (or G-CS-RNTI) used in the above solutions may be replaced by another group ID e.g., in future standards.

Further, in the above solutions it is used as an example that the UE receives the TB but with an error in decoding. Alternatively or additionally, the above solutions apply to the case where the UE could not receive the TB at all, although it was scheduled via DCI. In such a case, the UE cannot even begin the decoding, thus also resulting in a failure in the decoding.

A possible outcome of the standardization is that only the configuration part (steps S11a/S11b, S21a/S21b in the above figures) will be standardized and the UE behavior is left for the implementation. UE then either tries to decode the PTM retransmissions or does not.

It is noted that, although in the above-illustrated example embodiments (with reference to the figures), the messages communicated/exchanged between the network components/elements may appear to have specific/explicit names, depending on various implementations (e.g., the underlining technologies), these messages may have different names and/or be communicated/exchanged in different forms/formats, as can be understood and appreciated by the skilled person.

According to some example embodiments, there are also provided corresponding methods suitable to be carried out by the apparatuses (network elements/components) as described above, such as the UE, the CU, the DU, etc.

It should nevertheless be noted that the apparatus (device) features described above correspond to respective method features that may however not be explicitly described, for reasons of conciseness. The disclosure of the present document is considered to extend also to such method features. In particular, the present disclosure is understood to relate to methods of operating the devices described above, and/or to providing and/or arranging respective elements of these devices.

Further, according to some further example embodiments, there is also provided a respective apparatus (e.g., implementing the UE, the CU, the DU, etc., as described above) that comprises at least one processing circuitry, and at least one memory for storing instructions to be executed by the processing circuitry, wherein the at least one memory and the instructions are configured to, with the at least one processing circuitry, cause the respective apparatus to at least perform the respective steps as described above.

Yet in some other example embodiments, there is provided a respective apparatus (e.g., implementing the UE, the CU, the DU, etc., as described above) that comprises respective means configured to at least perform the respective steps as described above.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

It should also to be noted that the disclosed example embodiments can be implemented in many ways using hardware and/or software configurations. For example, the disclosed embodiments may be implemented using dedicated hardware and/or hardware in association with software executable thereon. The components and/or elements in the figures are examples only and do not limit the scope of use or functionality of any hardware, software in combination with hardware, firmware, embedded logic component, or a combination of two or more such components implementing particular embodiments of the present disclosure.

It should further be noted that the description and drawings merely illustrate the principles of the present disclosure. Those skilled in the art will be able to implement various arrangements that, although not explicitly described or shown herein, embody the principles of the present disclosure and are included within its spirit and scope. Furthermore, all examples and embodiment outlined in the present disclosure are principally intended expressly to be only for explanatory purposes to help the reader in understanding the principles of the proposed method. Furthermore, all statements herein providing principles, aspects, and embodiments of the present disclosure, as well as specific examples thereof, are intended to encompass equivalents thereof.

LIST OF ABBREVIATIONS

DCI Downlink control information
DRX Discontinuous reception
HARQ Hybrid automatic repeat request
MBS Multicast/broadcast services
MCCH MBS control channel
PTM Point To Multipoint
PTP Point To Point
RTT Round Trip Time
TMGI Temporary Mobile Group Identity

The invention claimed is:

1. A User Equipment, UE, comprising:
at least one processor, and
at least one memory storing instructions that, when executed by the at least one processor, cause the UE at least to, during or before a Multicast/Broadcast Service, MBS, session:
receive, from a network node, a configuration message configuring at least one Retransmission Timer;
receive, while the UE is in an inactive state or an idle state, a Physical Downlink Control Channel, PDCCH, transmission that is associated with the MBS session and that schedules a Transport Block, TB, of the MBS session with a group identifier identifying a group of UEs comprising the UE in the inactive or idle state and one or more UEs in a connected state;
receive the scheduled TB in the inactive or idle state, via Point-To-Multipoint, PTM, Physical Downlink Shared Channel, PDSCH transmission associated with the MBS session; and
in case of determining a failure in decoding the received TB:
start the at least one Retransmission Timer based on the configuration message; and
monitor, before the at least one Retransmission Timer expires, a PDCCH for at least one PTM retransmission for the failed TB requested by the one or more UEs in the connected state via at least one Hybrid Automatic Repeat Request, HARQ, feedback to the network node.

2. The UE according to claim 1, wherein the at least one Retransmission Timer comprises a HARQ Round-Trip-Time, RTT, Timer and a Discontinuous Reception, DRX, Retransmission Timer,
wherein the UE, in the inactive or idle state, is configured to:
receive, via the PDCCH transmission, Downlink Control Information, DCI, comprising a timing indicator for indicating a time slot for the at least one HARQ feedback,
start the HARQ RTT Timer after a predetermined symbol in the indicated time slot; and
start the DRX Retransmission Timer after the HARQ RTT Timer expires.

3. The UE according to claim 2, wherein:
the indicated time slot comprises a plurality of symbols,
the UE is pre-configured with a fixed number indicating a corresponding symbol comprised in the indicated time slot as the predetermined symbol that is default for all MBS sessions.

4. The UE according to claim 2, wherein:
the indicated time slot comprises a plurality of symbols,
the configuration message further configures the UE with a specific number indicating a corresponding symbol of the indicated time slot as the predetermined symbol for a specific MBS session or default for all MBS sessions.

5. The UE according to claim 2, wherein the UE is configured to:
extend the configured DRX Retransmission Timer with at least one additional time slot, when the predetermined symbol is the first symbol in the indicated time slot.

6. The UE according to claim 2, wherein the configuration message comprises information for further configuring the UE with a list of values for interpreting the timing indicator by reference to a value comprised in the list, and wherein the UE is configured to determine the time slot on the basis of the received timing indicator indicating one of the values of the list.

7. The UE according to claim 6, wherein the timing indicator is a PDSCH-to-HARQ_feedback timing indicator, wherein the list is provided via dl-DataToUL-ACK parameter or dl-DataToUL-ACK-MulticastDCI-Format4-1 parameter or the list comprises values {1, 2, 3, 4, 5, 6, 7, 8}.

8. The UE according to claim 2, wherein:
the configuration message comprises a full PUCCH configuration for the UE, and
the DCI comprises, in addition to the timing indicator, a PUCCH resource indicator, PRI, indicating the predetermined symbol comprised in the time slot indicated by the timing indicator for sending the at least one HARQ feedback.

9. The UE according to claim 1, wherein the configuration message is per Temporary Mobile Group Identity, TMGI, or a corresponding identifier identifying a specific multicast service or all multicast services of the group of UEs.

10. The UE according to claim 1, wherein the UE is configured to, in the inactive or idle state, receive the same PDCCH transmission associated with the MBS session as the one or more UEs in connected state.

11. The UE according to claim 1, wherein:
the PTM PDSCH transmission for the failed TB comprises a plurality of symbols,
wherein the UE is further caused to, in the inactive or idle state:
start the at least one Retransmission Timer after the last symbol comprised in the PTM PDSCH transmission for the failed TB.

12. The UE according to claim 1, wherein:
the UE, in the inactive or idle state, is configured to receive, via the PDCCH transmission, Downlink Control Information, DCI, scheduling the failed TB transmission, wherein the DCI comprises information for indicating a time slot in which the HARQ feedback in response to the failed TB is sent by the one or more UEs in the connected state,
wherein the UE is further caused to, in the inactive or idle state:
determine to start the at least one Retransmission Timer in the indicated time slot.

13. The UE according to claim 1, wherein the configuration message is a Radio Resource Control, RRC, release message or an MBS Control Channel, MCCH message.

14. A network node of a radio access network, configured to establish communication to a group of UEs, the group being identified by a group identifier, the network node comprising:
at least one processor, and
at least one memory storing instructions that, when executed by the at least one processor, cause the network node at least to, during or before a Multicast/Broadcast Service, MBS, session:
transmit a configuration message to at least one of said plurality of UEs for configuring the at least one UE with at least one Retransmission Timer, wherein the at least one UE is in an inactive state or an idle state and at least one UE is in connected state;
schedule, via one or more Physical Downlink Control Channel, PDCCH, transmissions associated with the MBS session, a Transport Block, TB, towards the group of UEs identified by the group identifier;
transmit the scheduled TB, via Point-To-Multipoint, PTM, Physical Downlink Shared Channel, PDSCH associated with the MBS session, to the group of UEs identified by the group identifier;
determine resources for retransmissions for the transmitted TB in response to receiving at least one Hybrid Automatic Repeat Request, HARQ, feedback from the at least one UE in connected state indicating a failure in decoding the TB; and
initiate retransmissions for the failed TB at the determined resources and based on the at least one Retransmission Timer configured for the at least one UE in inactive or idle state,
wherein the configuration message comprises information for the at least one UE in inactive or idle state to determine when to start the at least one Retransmission Timer based on the configuration message.

15. A method of a User Equipment, UE, during or before a Multicast/Broadcast Service, MBS, session:
receiving, from a network node, a configuration message configuring at least one Retransmission Timer;
receiving, while the UE is in an inactive state or an idle state, a Physical Downlink Control Channel, PDCCH, transmission that is associated with the MBS session and that schedules a Transport Block, TB, of the MBS session with a group identifier identifying a group of UEs comprising the UE in the inactive or idle state and one or more UEs in a connected state;
receiving the scheduled TB in the inactive or idle state, via Point-To-Multipoint, PTM, Physical Downlink Shared Channel, PDSCH transmission associated with the MBS session; and
in case of determining a failure in decoding the received TB:
starting the at least one Retransmission Timer based on the configuration message; and
monitoring, before the at least one Retransmission Timer expires, a PDCCH for at least one PTM retransmission for the failed TB requested by the one or more UEs in the connected state via at least one Hybrid Automatic Repeat Request, HARQ, feedback to the network node.

16. The method according to claim 15, wherein the at least one Retransmission Timer comprises a HARQ Round-Trip-Time, RTT, Timer and a Discontinuous Reception, DRX, Retransmission Timer,
wherein the UE, in the inactive or idle state, performs the following:
receiving, via the PDCCH transmission, Downlink Control Information, DCI, comprising a timing indicator for indicating a time slot for the at least one HARQ feedback,
starting the HARQ RTT Timer after a predetermined symbol in the indicated time slot; and
starting the DRX Retransmission Timer after the HARQ RTT Timer expires.

17. The method according to claim 16, wherein:
the indicated time slot comprises a plurality of symbols,
the UE is pre-configured with a fixed number indicating a corresponding symbol comprised in the indicated time slot as the predetermined symbol that is default for all MBS sessions.

18. The method according to claim 16, wherein:
the indicated time slot comprises a plurality of symbols,
the configuration message further configures the UE with a specific number indicating a corresponding symbol of the indicated time slot as the predetermined symbol for a specific MBS session or default for all MBS sessions.

19. The method according to claim 16, wherein the UE performs the following:

extending the configured DRX Retransmission Timer with at least one additional time slot, when the predetermined symbol is the first symbol in the indicated time slot.

20. The method according to claim 15, wherein the configuration message is per Temporary Mobile Group Identity, TMGI, or a corresponding identifier identifying a specific multicast service or all multicast services of the group of UEs.

* * * * *